United States Patent
Matsumoto et al.

(10) Patent No.: US 9,860,403 B2
(45) Date of Patent: Jan. 2, 2018

(54) SHEET FEEDING APPARATUS, AND READING APPARATUS AND IMAGE FORMING APPARATUS USING THE SAME

(71) Applicant: CANON KABUSHIKI KAISHA, Tokyo (JP)

(72) Inventors: Akira Matsumoto, Toride (JP); Toshifumi Itabashi, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/165,342

(22) Filed: May 26, 2016

(65) Prior Publication Data
US 2016/0366295 A1 Dec. 15, 2016

(30) Foreign Application Priority Data

Jun. 10, 2015 (JP) .................................. 2015-117181
Sep. 2, 2015 (JP) .................................. 2015-172984

(51) Int. Cl.
| | | |
|---|---|---|
| H04N 1/04 | (2006.01) | |
| H04N 1/00 | (2006.01) | |
| G03G 15/00 | (2006.01) | |
| B65H 5/06 | (2006.01) | |
| B65H 7/02 | (2006.01) | |

(52) U.S. Cl.
CPC .......... *H04N 1/00588* (2013.01); *B65H 5/06* (2013.01); *B65H 7/02* (2013.01); *G03G 15/6529* (2013.01); *H04N 1/00596* (2013.01); *H04N 1/00602* (2013.01); *H04N 1/00652* (2013.01)

(58) Field of Classification Search
CPC ............ B65H 2511/10; B65H 2511/11; B65H 2701/1313; B65H 2220/09; B65H 2511/12; H04N 1/00602; H04N 1/00745; H04N 1/0057; H04N 1/00588; H04N 1/00591; H04N 1/00652; H04N 1/00681; H04N 1/00705
USPC ....... 271/228, 265.01, 261, 10.01, 147, 162, 271/258.01, 265.04; 358/1.12, 498, 1.13, 358/474, 497
See application file for complete search history.

(56) References Cited

U.S. PATENT DOCUMENTS

| | | | |
|---|---|---|---|
| 5,328,163 A * | 7/1994 | Yamada ................... | B65H 3/06 271/10.01 |
| 7,641,188 B2 | 1/2010 | Hiura et al. | |
| 7,900,909 B2 | 3/2011 | Hiura et al. | |
| 8,238,778 B2 | 8/2012 | Itabashi et al. | |
| 8,342,517 B2 * | 1/2013 | Kinoshita .............. | B65H 9/002 271/226 |
| 8,837,019 B2 | 9/2014 | Matsumoto | |
| 8,979,088 B2 | 3/2015 | Itabashi | |
| 9,712,701 B2 * | 7/2017 | Yamamoto ......... | H04N 1/00615 |

(Continued)

FOREIGN PATENT DOCUMENTS

| | | | |
|---|---|---|---|
| JP | 2001-146329 A | 5/2001 | |
| JP | 2012-254856 A | 12/2012 | |

*Primary Examiner* — Negussie Worku
(74) *Attorney, Agent, or Firm* — Fitzpatrick, Cella, Harper & Scinto

(57) ABSTRACT

When a sheet fed by a feed rotating member passes through a detection area of a leading edge detecting portion, the feed rotating member is moved to a retract position based on the detection. When the fed sheet does not pass through the detection area, the feed rotating member is moved to the retract position after a predetermined time elapses since the sheet starts to be fed by the feed rotating member.

20 Claims, 16 Drawing Sheets

(56) References Cited

U.S. PATENT DOCUMENTS

| | | | | |
|---|---|---|---|---|
| 2004/0252353 | A1* | 12/2004 | Sano | H04N 1/00681 358/474 |
| 2010/0061783 | A1* | 3/2010 | Kawasaki | B65H 9/002 399/381 |
| 2012/0314267 | A1* | 12/2012 | Suzuki | G03G 15/607 358/498 |
| 2013/0009355 | A1* | 1/2013 | Yasuda | B65H 1/14 271/127 |
| 2013/0236227 | A1* | 9/2013 | Hirako | B65H 7/02 399/371 |
| 2014/0292985 | A1* | 10/2014 | Matsumoto | B41J 11/001 347/104 |
| 2016/0176672 | A1* | 6/2016 | Lochbichler | B65H 39/10 270/58.04 |
| 2016/0185541 | A1* | 6/2016 | Matsumoto | B65H 5/062 271/274 |
| 2016/0255225 | A1* | 9/2016 | Yamamoto | H04N 1/00615 358/1.12 |
| 2016/0342124 | A1* | 11/2016 | Iwadate | G03G 15/6508 |

* cited by examiner

SHEET FEEDING APPARATUS, AND READING APPARATUS AND IMAGE FORMING APPARATUS USING THE SAME

BACKGROUND OF THE INVENTION

Field of the Invention

The present invention relates to a sheet feeding apparatus which feeds a sheet stacked on a stacking member, and a reading apparatus and an image forming apparatus which are provided with the sheet feeding apparatus.

Description of the Related Art

In an original conveying and reading apparatus used in a copying machine and a facsimile apparatus, sheets (originals) stacked on a sheet stacking member are fed by a pickup roller (a feed rotating member), and separated one by one by a separation portion, and fed to a reading portion. Then, an image written in the sheet is optically read by the reading portion, and then the sheet is discharged to a discharge portion.

In a case where the pickup roller always abuts on the sheet stacked on the stacking member when the sheet is fed, there is a concern that a separating function of the separation portion may be degraded by a contact pressure between the pickup roller and the sheet when the fed sheet is separated by the separation portion. In addition, the contact pressure operates as a load when the fed sheet is drawn and conveyed by a pair of conveying rollers on the downstream side.

For this reason, the pickup roller is provided to be movable to a feed position where the pickup roller abuts on the sheet and to a retract position where the pickup roller is separated from the sheet stacked in a tray. When a leading edge of the sheet fed out by the pickup roller is detected by a sensor provided at a predetermined position, the pickup roller moves to the retract position. Then, the pickup roller comes to abut on the sheet again at a timing of feeding the next sheet to be fed out (Japanese Patent Laid-Open No. 2001-146329).

However, in the configuration of Patent Literature 1, the sensor may not always detect the leading edge of the sheet depending on the arrangement of the sensor to detect the leading edge of the sheet. For example, in a case where the sensor is disposed at the end portion in a sheet width direction (a direction orthogonal to a conveying direction), and when a sheet having a short width is fed, there is a concern that the sheet does not pass through a detection area of the sensor. Therefore, when the control is always performed only using the sensor, there is a concern that a defect occurs in the case of the sheet not passing through the detection area of the sensor.

SUMMARY OF THE INVENTION

A sheet feeding apparatus according to the present invention includes: a size detecting portion which detects a size of a sheet width direction orthogonal to a conveying direction of a fed sheet; a conveying mechanism, the conveying mechanism including, a feed rotating member which feeds the sheet stacked on a stacking member, and a conveying portion which conveys the sheet fed by the feed rotating member; a leading edge detecting portion which detects a leading edge of the sheet reached the conveying portion; and a controller which controls the conveying mechanism, wherein the leading edge detecting portion is disposed at a position departing from the conveying portion in the sheet width direction, and wherein, based on a sheet size detected by the size detecting portion, in a case where the sheet fed by the feed rotating member to be passe through a detection area of the leading edge detecting portion, the controller performs a first control on the conveying mechanism based on the detection of the leading edge detecting portion, and in a case where the fed sheet does not to be pass through the detection area, the controller performs a second control on the conveying mechanism not based on the detection of the leading edge detecting portion.

According to the present invention, it is possible to provide a sheet feeding apparatus which can perform an optimum control regardless of a sheet size, and a reading apparatus and an image forming apparatus which are provided with the sheet feeding apparatus.

Further features of the present invention will become apparent from the following description of exemplary embodiments with reference to the attached drawings.

DESCRIPTION OF THE EMBODIMENTS

First Embodiment

Next, a sheet feeding apparatus according to the embodiment of the present invention will be described together with a reading apparatus provided with the sheet feeding apparatus.

<Reading Apparatus>

Figure 1:
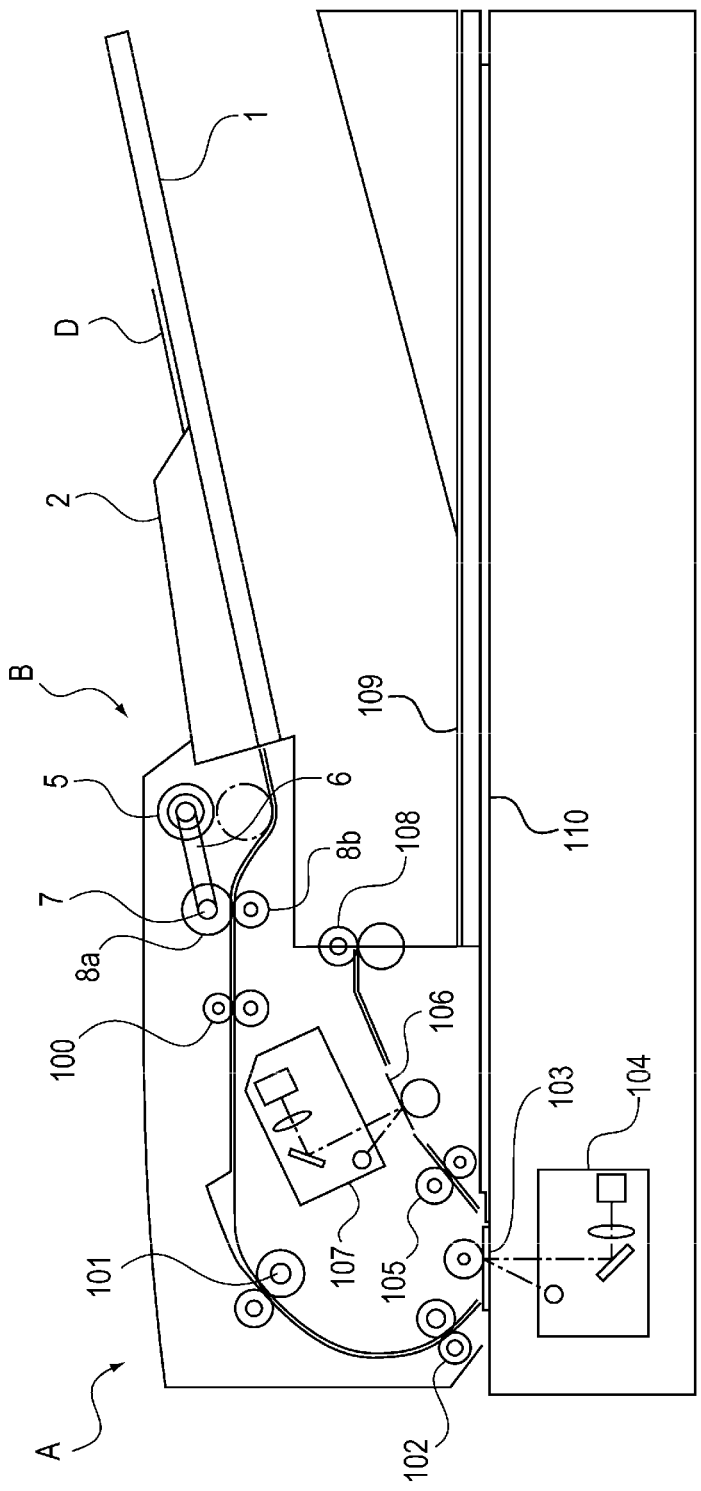
FIG. 1 is a cross-sectional view schematically illustrating a reading apparatus.

FIG. 1 is a cross-sectional view schematically illustrating a reading apparatus A according to a first embodiment. When described about the configuration of the reading apparatus A with an original reading operation, a plurality of sheets (the originals) is set in a stacking member 1 where the sheet-like originals are stacked, and the sheets are separated and fed one by one by a sheet feeding apparatus B (described below). When the fed sheet passes through the upper portion of a first platen 103 by pairs of conveying rollers 100, 101, and 102, the information written on one surface of the sheet is optically read by a first reading portion 104.

Thereafter, the sheet is conveyed by a pair of conveying rollers 105. When the sheet passes though the upper portion of a second platen 106, the information written on the other surface is optically read by a second reading portion 107, and discharged to a discharge portion 109 by a pair of discharge rollers 108.

In addition, the first reading portion 104 is provided moveable along a third platen 110, and capable of reading a thick book placed on the third platen 110.

<Sheet Feeding Apparatus>

Figure 2A:
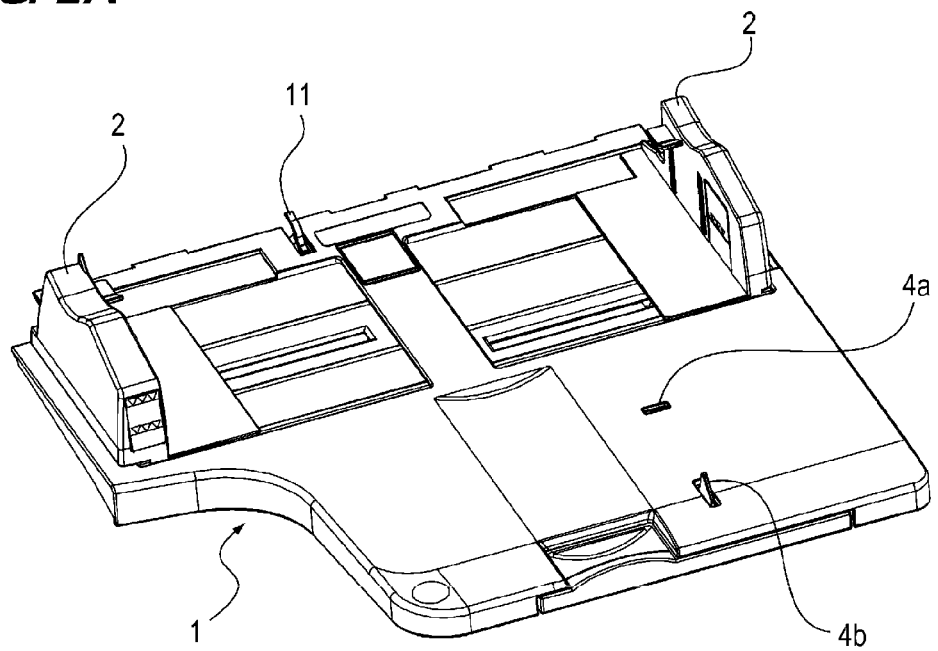
FIGS. 2A and 2B are perspective views for describing a stacking member and a diagram for describing the inner portion.
Figure 2B:
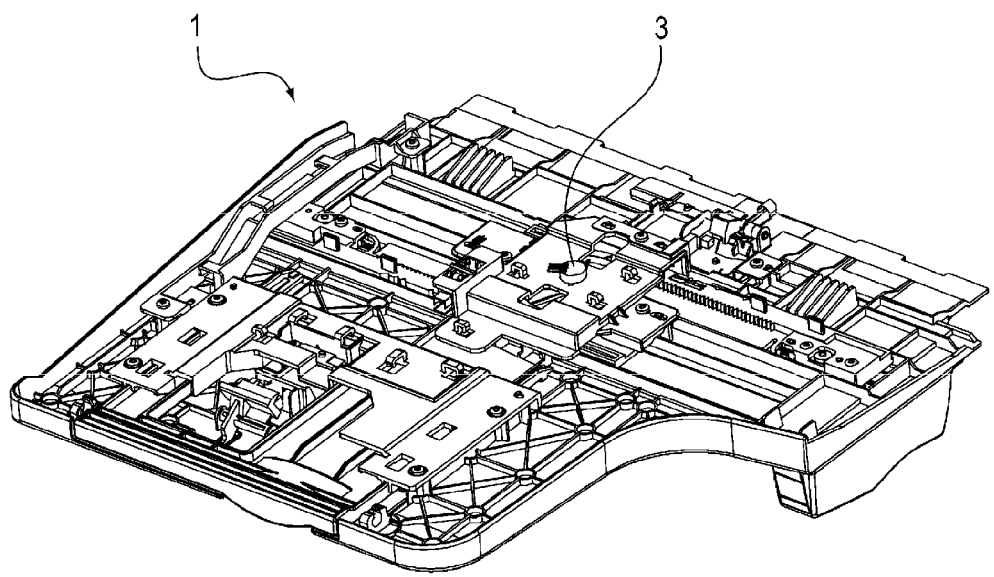

The sheet feeding apparatus includes a conveying mechanism configured by a feed rotating member which feeds the sheet stacked on the stacking member 1 and a separating/conveying portion which separates and feeds the sheet thus fed. Then, as illustrated in FIGS. 2A and 2B, a regulating member 2 is disposed to be slidable in a sheet width direction (a direction orthogonal to a conveying direction) in the stacking member 1 where the sheet is stacked. The regulating member 2 can feed the original while aligning the position in the width direction at the time of feed the sheet by regulating both ends in the width direction of the sheet stacked on the stacking member 1. Further, the right and left regulating members 2 of this embodiment are moveable symmetrically in the width direction of the sheet, and regulates the position of the sheet such that the center in the width direction of the fed sheet is positioned at the feeding center.

(Sheet Size Detecting Portion)

In addition, the stacking member 1 is provided with a sheet width detecting sensor 3 which can detect a position of the regulating member 2. The sheet width detecting sensor 3 configures a size detecting portion which detects the size in the width direction of the sheet by detecting the position of the regulating member 2 which moves according to the width of the sheet.

In addition, a plurality (two in this embodiment) of sheet length detecting sensors 4a and 4b is disposed in the stacking member 1 in the sheet conveying direction. The sheet length detecting sensors 4a and 4b are provided at positions according to the length in the conveying direction of the sheet stacked on the stacking member 1. The size in the conveying direction of the sheet is detected by detection signals of the respective sensors according to the positions of the tailing edge of the sheet when the sheet is stacked on the stacking member 1.

The size of the sheet stacked on the stacking member 1 can be detected by the sheet width detecting sensor 3 and the sheet length detecting sensors 4a and 4b.

(Pickup Roller)

A pickup roller 5 serving as the feed rotating member, which applies a feeding force to the sheet stacked on the stacking member, is provided on the downstream side in the conveying direction of the original of the stacking member 1. As illustrated in FIG. 1, the pickup roller 5 is rotatably provided in an end portion of a support member 6.

The support member 6 configures a moving portion which moveably supports the pickup roller 5 at a feed position and a retract position. The other end portion of the support member 6 on a side opposed to the end portion where the pickup roller 5 is provided is provided in a drive shaft 7. The support member 6 is rotatable about the drive shaft 7. When not feeding the original, the pickup roller 5 moves upward from the stacking member 1 and is on standby as illustrated in FIG. 1.

Figure 3A:
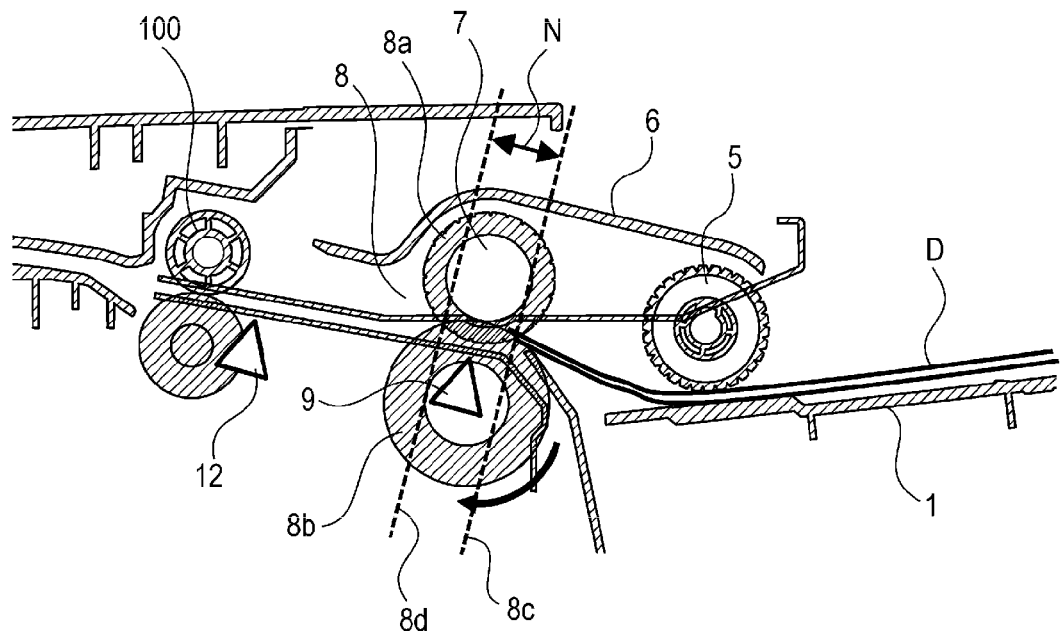
FIGS. 3A and 3B are cross-sectional views for describing a sheet feeding apparatus.
Figure 3B:
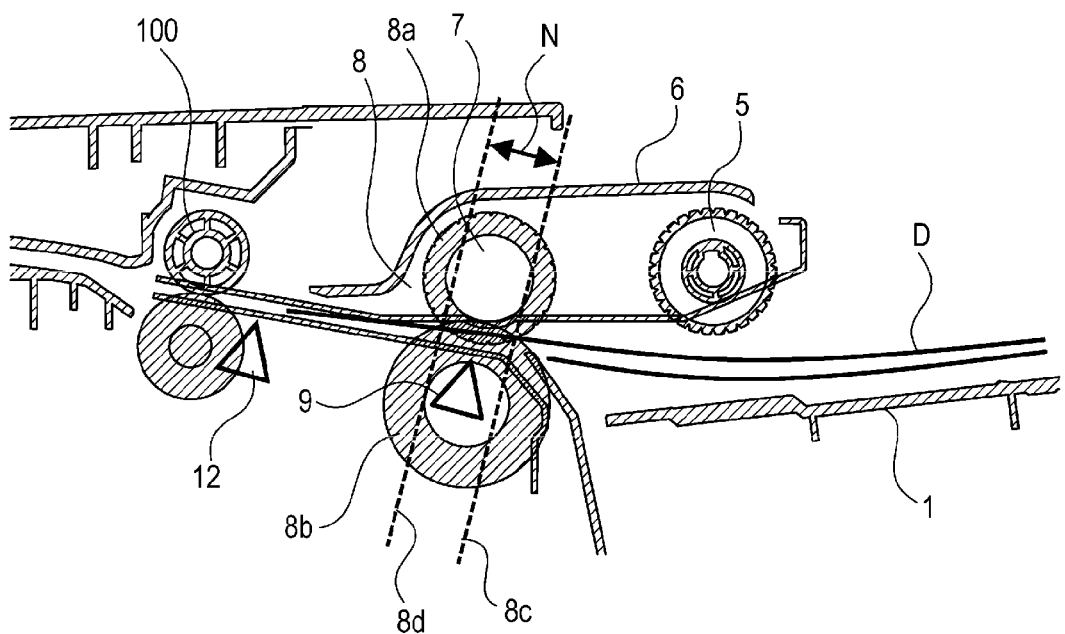

Then, when a sheet D is set on the stacking member 1 and a feed signal is received, the drive shaft 7 rotates to cause the support member 6 to rotate in the clockwise direction. As illustrated in FIG. 3A, the pickup roller 5 moves to the feed position to abut on the sheet D stacked on the stacking member 1. On the other hand, when a feeding operation of the sheet is ended, the drive shaft 7 rotates in a reverse direction with respect to the previous direction to cause the support member 6 to rotate in the counterclockwise direction. As illustrated in FIG. 3B, the pickup roller 5 goes upward and moves to the retract position to be separated from the sheet D.

(Separation Portion)

A separation portion 8 is provided on the downstream side in the conveying direction of the sheet of the pickup roller 5 to separate and convey the sheet D fed by the pickup roller 5 one by one. The separation portion 8 is configured by a separation roller 8a (a first member) which rotates in a direction of conveying the fed sheet to the downstream side and a retard roller 8b (a second member) which rotates in a direction of returning the sheet to the upstream side in the conveying direction of the sheet.

In a case where a plurality of sheet is double-fed and conveyed to a nip area where the separation roller 8a and the retard roller 8b come in contact with each other, the retard roller 8b is operated to return the double-fed sheets (the second and subsequent sheets) to the upstream side in the conveying direction. Further, in a case where a torque limiter (not illustrated) is provided in the retard roller 8b and there is no sheet in the nip area, and in a case where one sheet is conveyed without being double-fed, the retard roller 8b follows the rotation of the separation roller 8a.

As described above, the separation portion 8 also serves as a conveying portion which conveys the sheet using the separation roller 8a and the retard roller 8b to the downstream side by nipping the sheet using both rollers while separating the sheets one by one.

Herein, since the separation roller 8a and the retard roller 8b are made of an elastic material, the nip area includes a nip area N of a certain width from a nip position upstream end 8c to a nip position downstream end 8d as illustrated in FIG. 3A.

(Leading Edge Detecting Sensor)

Figure 4:
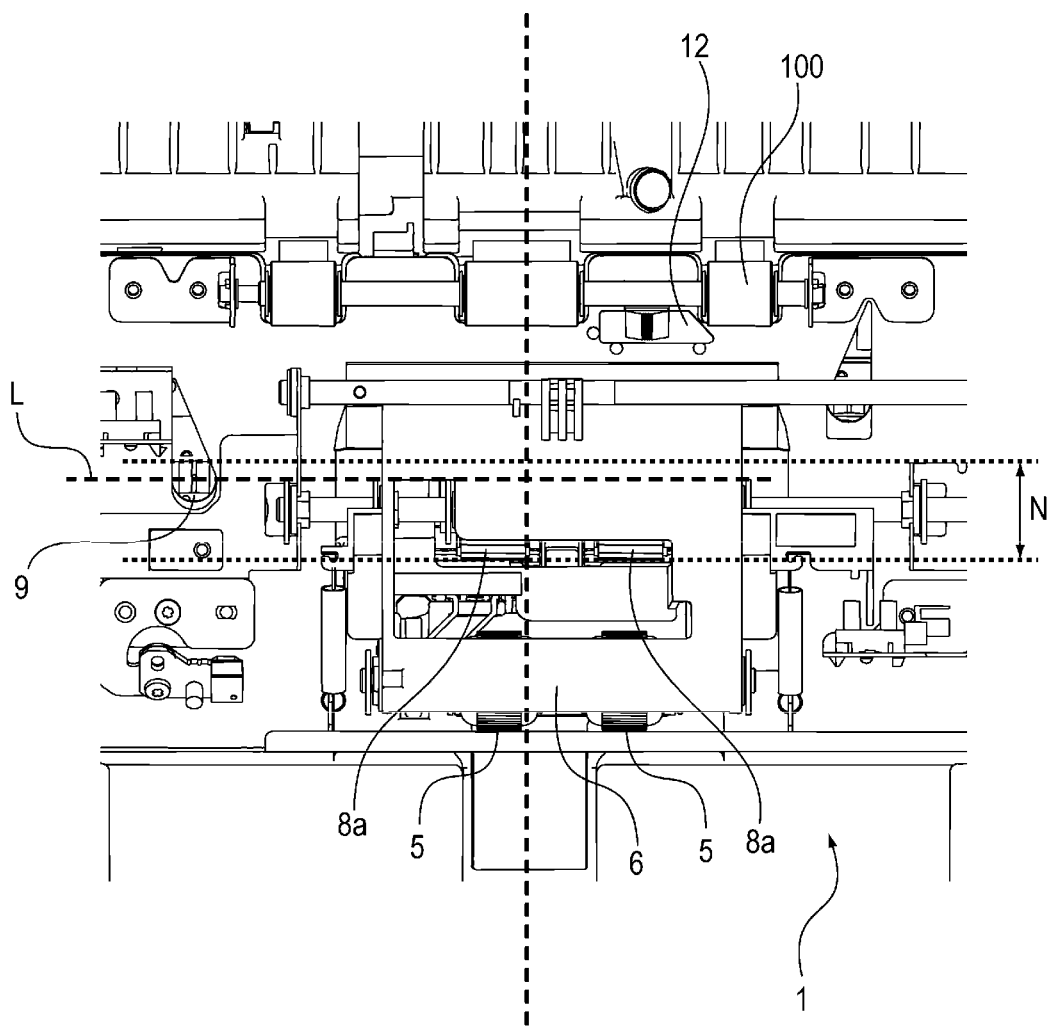
FIG. 4 is a top view of the sheet feeding apparatus.

The sheet feeding apparatus B is provided with a leading edge detecting portion to detect whether the leading edge of the fed sheet reaches the nip area N between the separation roller 8a and the retard roller 8b. As illustrated in FIGS. 3A, 3B, and 4, the leading edge detecting portion includes a leading edge detecting sensor 9 which is turned on and off according to the presence or absence of the sheet. The leading edge detecting portion detects whether the leading edge of the fed sheet passes through the position of the leading edge detecting sensor 9, so that the leading edge of the sheet can be detected.

The leading edge detecting sensor 9 is disposed at a position on an extension L (see FIG. 4) in the sheet width direction in the nip area N between the separation roller 8a and the retard roller 8b, and detects the leading edge of the sheet passing through the upper portion of the leading edge detecting sensor 9. Therefore, the leading edge detecting sensor 9 can detect the leading edge of the fed sheet when the leading edge of the sheet reaches the nip area N.

The leading edge detecting sensor 9 can be disposed at the center in the sheet width direction in such a configuration that the sheet position is regulated and fed based on the center as described in this embodiment. When being disposed at the center in the sheet width direction, the leading edge detecting sensor 9 can detect that the leading edge of the sheet reaches the nip area N of the separation portion regardless of a sheet size since the fed sheet always passes through the upper portion of the leading edge detecting sensor 9 even when the sheet size is small.

However, in practice, since there are movable portions such as the separation roller 8a, the retard roller 8b, and the support member 6, the leading edge detecting sensor 9 is difficult to be disposed at the center in the width direction of the sheet feeding area. Thus, the leading edge detecting sensor 9 in this embodiment is disposed at a position departing from the center in the width direction of the conveyed sheet (that is, on the outside from the support member 6 in the sheet width direction) as illustrated in FIG. 4.

Since the leading edge detecting sensor 9 is disposed on the outside from the support member 6 in the sheet width direction as described above, the sheet having a large sheet width (for example, A3 or A4 size) passes through the detection area of the leading edge detecting sensor 9, so that the leading edge of the sheet can be detected. However, since the sheet having a small sheet width such as A5R size does not pass through the detection area of the leading edge detecting sensor 9, the leading edge of the sheet cannot be detected by the leading edge detecting sensor 9.

In the sheet feeding apparatus of this embodiment, the pickup roller 5 is moved to the retract position at a timing when the leading edge of the sheet fed by the pickup roller 5 is detected by the leading edge detecting sensor 9. However, the leading edge may not be detected by the leading edge detecting sensor 9 depending on the size of the fed sheet as described above. Therefore, in this embodiment, the pickup roller 5 is controlled to move to the retract position according to the sheet size.

<Movement Control Pickup Roller>

As described above, when the double-fed sheets are separated by the separation roller 8a and the retard roller 8b, there is a concern that a separation failure may occur when the pickup roller 5 is placed at the feed position in the sheet on the stacking member due to its own weight. Therefore, when the sheet is separated in the separation portion 8, the pickup roller 5 is controlled to move to the retract position.

Figure 5:
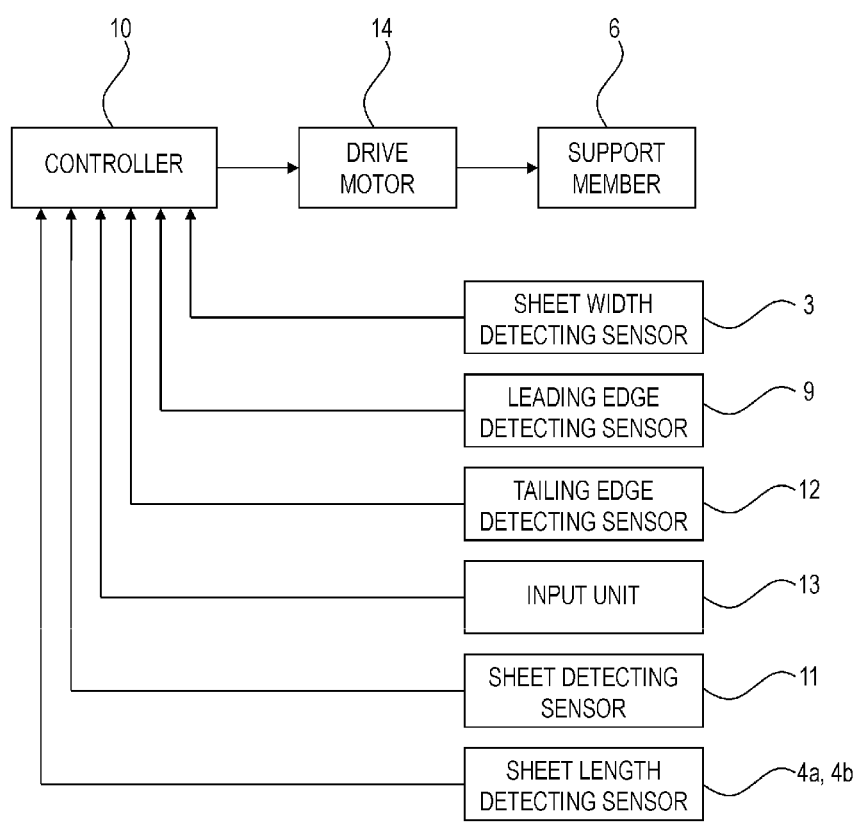
FIG. 5 is a diagram illustrating control blocks for a movement of a pickup roller.

Next, a configuration for a retract control of the pickup roller will be described. FIG. 5 is a block diagram illustrating a configuration of a controller which causes the pickup roller to move.

As illustrated in FIG. 5, a controller 10 for performing a movement control of the pickup roller 5 receives the detection signals from the sheet width detecting sensor 3, the sheet length detecting sensors 4a and 4b, and the leading edge detecting sensor 9 as described above. Furthermore, the controller 10 receives the detection signals from a sheet detecting sensor 11 (see FIG. 2A) which detects the presence or absence of the sheet on the stacking member 1, and a tailing edge detecting sensor 12 (see FIGS. 3A, 3B, and 4) which is disposed on the downstream side of the separation portion 8 to detect the tailing edge of the fed sheet. Furthermore, the controller 10 receives information input by the user from an input unit 13 such as an operation panel.

The controller 10 outputs a drive signal of a drive motor 14 which rotates the support member 6 causing the pickup roller 5 to move according to the respective input signals.

Next, an operation of the movement control of the pickup roller 5 by the controller 10 will be described with reference to flowcharts of FIGS. 6 and 7.

When the controller 10 receives a sheet feed signal for the original reading operation, it is determined whether a feeding mode is a mixed mode (S1). The mixed mode is a mode of continuously reading a plurality of sheets, having different widths mixed, which are stacked on the stacking member 1. The mixed mode is set by the user through the input unit 13. In a case where the mixed mode is not input by the user, the sheets are fed in a normal mode assuming that the plurality of sheets having the same width is stacked on the stacking member 1. Further, the feeding operation in the case of the mixed mode will be described below.

(Feeding Control in Normal Mode)

Figure 6:
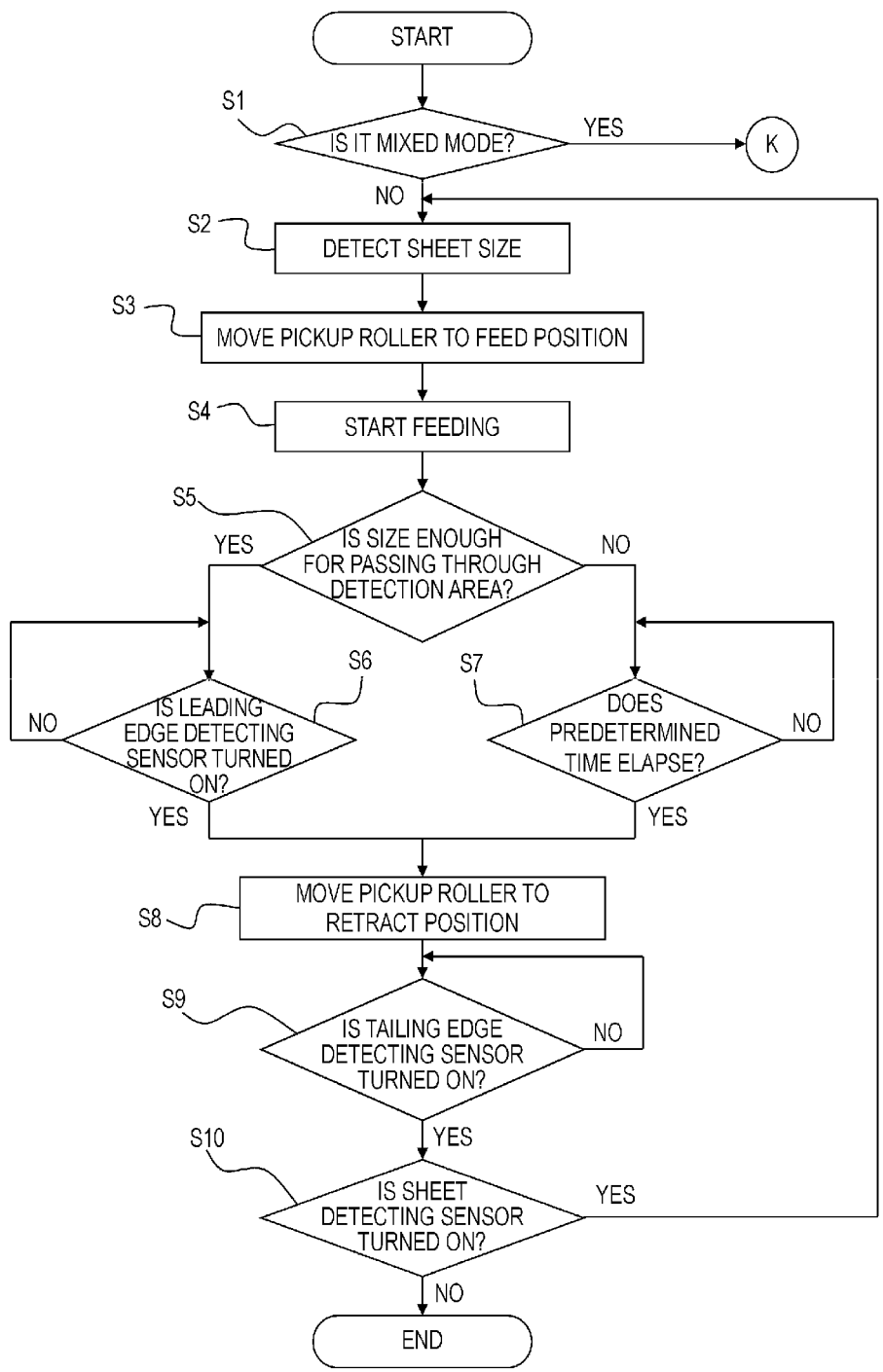
FIG. 6 is a flowchart illustrating an operation control of the pickup roller in a normal mode.
Figure 7:
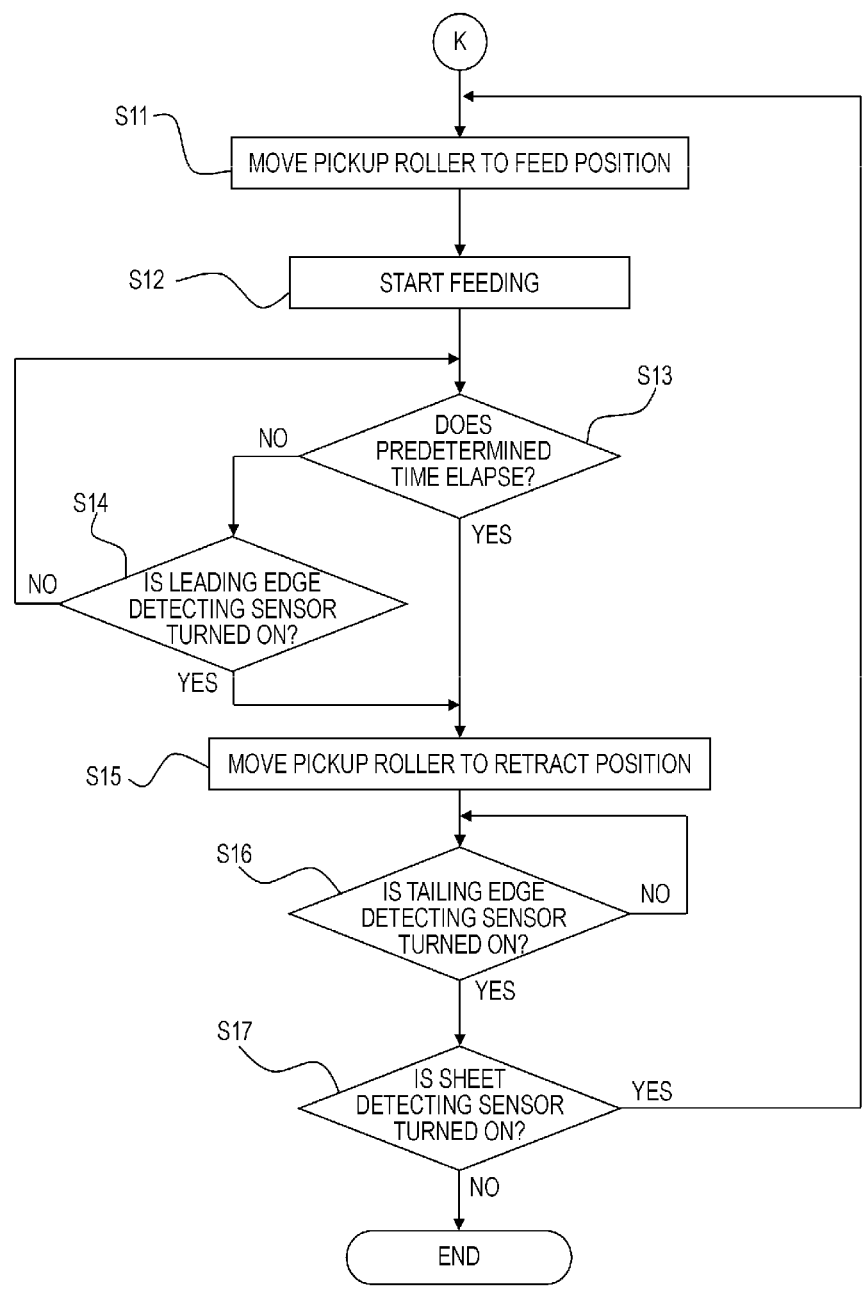
FIG. 7 is a flowchart illustrating an operation control of the pickup roller in a mixed mode.

In a case where the sheet is fed in the normal mode, the sheet size is detected based on the detection signals from the sheet width detecting sensor 3 and the sheet length detecting sensors 4a and 4b as illustrated in FIG. 6 (S2). Then, the drive motor 14 is operated to make the pickup roller 5 move down and toward the feed position (S3), and the pickup roller 5 is rotated to start the feeding operation of the sheet (S4).

When the feeding operation starts, the controller 10 determines whether the fed sheet has a size enough for passing through the detection area of the leading edge detecting sensor 9 based on the detected sheet size (S5). In a case where it is determined that the sheet has a size enough for passing through the detection area, and when the leading edge of the fed sheet is detected by the leading edge detecting sensor 9 (the leading edge detecting sensor is turned ON) (S6), the support member 6 is rotated to make the pickup roller 5 move toward the retract position (S8).

As described above, the leading edge detecting sensor 9 is disposed in the same area as the nip area N between the separation roller 8a and the retard roller 8b in the conveying direction of the sheet. Therefore, the pickup roller 5 moves toward the retract position when the leading edge of the fed sheet reaches the nip area N. Accordingly, when the sheet is separated in the separation portion 8, the pickup roller 5 is separated from the sheet and retracted and thus a load caused by the pickup roller 5 abutting on the sheet disappears, so that the sheet is reliably separated.

On the other hand, in a case where the size of the fed sheet is not enough for passing through the detection area, the pickup roller 5 is moved toward the retract position after a predetermined time elapses after the sheet starts to be fed by the pickup roller 5 (S7, S8). The predetermined time is a time taken until the leading edge of the fed sheet reaches the nip area N after the pickup roller 5 starts to feed the sheet. The predetermined time is set in advance based on a rotation speed of the pickup roller 5 and a distance from the leading edge of the sheet set on the stacking member 1 up to the nip area N.

Therefore, even when the sheet has a size not enough for passing through the detection area of the leading edge detecting sensor 9, the pickup roller 5 moves toward the retract position when the leading edge of the sheet reaches the nip area N of the separation portion. Therefore, the load of the pickup roller 5 abutting on the sheet disappears, and thus the sheet is reliably separated.

Further, in this embodiment, there is provided a stopper (not illustrated) which abuts on the leading edge of the sheet at the time of setting the sheet, so that the leading edge of the sheet is set at a predetermined position when the sheet is set on the stacking member 1. The stopper is at a position to abut on the leading edge of the sheet stacked on the stacking member 1 by closing the feeding path of the sheet when the pickup roller 5 is at the retract position. Further, the stopper is configured to move while being interlocked with the rotation of the support member 6 when the pickup roller 5 moves to the feed position so as to open the feeding path.

When the sheet separated by the separation portion 8 is conveyed by the separation roller 8a and the tailing edge of the sheet is detected by the tailing edge detecting sensor 12 (the tailing edge detecting sensor is turned ON) (S9), and the next sheet is set on the stacking member 1, the procedure returns to Step S3. Then, the next sheet is fed by the pickup roller 5 (S10).

As described above, a trigger for retracting the pickup roller 5 according to the sheet size is switched by the detection signal of the leading edge detecting sensor 9 and a predetermined time. With such a configuration, even in a case where the sheet having a size not enough for passing through the detection area of the leading edge detecting sensor 9 is conveyed, a retract timing of the pickup roller 5 can be more accurately controlled. Therefore, it is possible to maximize the returning effect by the retard roller 8b.

(Feeding Control in Mixed Mode)

Next, the feeding control in a case where the mixed mode is selected by the user will be described with reference to the flowchart of FIG. 7.

When the mixed mode is selected and the controller 10 receives the sheet feed signal, the controller 10 makes the pickup roller 5 go down to move toward the feed position (S11), and the pickup roller 5 is rotated to start the feeding operation of the sheet (S12).

Since the sheets different in width are mixed in the case of the mixed mode, the leading edge may be detected by the leading edge detecting sensor 9, or not.

In this embodiment, in the case of the mixed mode, the pickup roller 5 moves to the retract position after a predetermined time required for the leading edge of the sheet fed by the pickup roller 5 to reach the nip area between the separation roller 8a and the retard roller elapses since the feeding operation starts (S13, S15). However, in the case of the mixed mode, there may be the sheet which has a size enough for passing through the detection area of the leading edge detecting sensor 9. Therefore, in this embodiment, the pickup roller 5 is moved to the retract position after the predetermined time elapses since the feeding operation starts. Furthermore, in a case where the leading edge of the fed sheet is detected by the leading edge detecting sensor 9 before the predetermined time elapses, the pickup roller 5 is moved up to the retract position based on the detection signal of the sensor with priority (S13, S14, and S15). Further, in the case of the mixed mode, the pickup roller 5 may be moved to the retract position after the predetermined time required for the leading edge of the sheet fed by the pickup roller 5 to reach the nip area between the separation roller 8a and the retard roller after the feeding operation starts elapses regardless of the detection result of the sheet width detecting sensor 3.

In a case where the movement to the retract position of the pickup roller 5 is controlled according to a time after the feeding operation starts, an error may occur in the predetermined time due to a variation in position of the leading edge of the sheet set on the stacking member 1 or an influence such as slipping between the pickup roller 5 and the sheet. On the other hand, in a case where the leading edge of the sheet is detected by the leading edge detecting sensor 9, the leading edge of the sheet is surely in the nip area. Then, even in a case where the sheets are mixed, it is a rare situation that all the sheets do not to pass through the detection area of the leading edge detecting sensor 9.

Therefore, when the leading edge of the sheet passing through the detection area of the leading edge detecting sensor 9 is detected by the leading edge detecting sensor 9 before the predetermined time elapses even in the mixed mode, the pickup roller 5 is retracted based on the sensor signal of the leading edge detecting sensor 9. With such a configuration, even in a case where the sheets having different sizes are mixed, the retract timing of the pickup roller 5 can be more accurately controlled.

After the pickup roller 5 is moved to the retract position as described above, the sheet separated by the separation portion 8 is conveyed by the separation roller 8a. When the tailing edge of the sheet is detected by the tailing edge detecting sensor 12 (the tailing edge detecting sensor is turned ON) (S16), and the next sheet is set on the stacking member 1, the procedure returns to Step S11 to perform the next sheet feeding by the pickup roller 5 (S17).

Modifications of First Embodiment

In the above-described embodiment, when the leading edge detecting sensor 9 detects the leading edge of the sheet before the predetermined time elapses after the feeding operation of the pickup roller 5 starts in the case of the mixed mode, the pickup roller 5 is controlled to be retracted according to the detection signal. However, the pickup roller 5 may be controlled to be moved to the retract position only in a case where the predetermined time elapses after the feeding operation of the pickup roller 5 starts regardless of the detection of the leading edge detecting sensor 9. Even in this case, the returning effect by the retard roller 8b can be improved.

In addition, in the above-described embodiment, the retard separation scheme using the separation roller 8a and the retard roller 8b is exemplified as the configuration of the separation portion. However, in place of the retard roller, a separation pad (a separation member) for pressing the sheet with the separation roller may be configured. Even in this case, the same effect as the above-described embodiment can be achieved by moving the pickup roller 5 to the retract position at the time when the sheet reaches the nip area between the separation roller and the separation pad.

Furthermore, in the above-described embodiment, the separation portion has been exemplified as a conveying portion which conveys the sheet fed by the pickup roller 5 toward the downstream side. However, for example, a pair of conveying rollers such as a pair of drawing rollers which rotates in a direction of conveying the sheet fed by the pickup roller 5 toward the downstream side in the conveying direction of the sheet may be used as the conveying portion in place of the separation mechanism. Even in such a case, the load of the pickup roller 5 abutting on the sheet can be cancelled from the sheet conveyed by the pair of drawing rollers by retracting the pickup roller 5 at the time when the leading edge of the sheet reaches the nip area of the pair of drawing rollers.

In addition, in this embodiment, the leading edge detecting sensor 9 is disposed at a position on an extension in the sheet width direction in the nip area N between the separation roller 8a and the retard roller 8b, but the invention is not limited thereto. The leading edge detecting sensor 9 may be positioned on the downstream side in the sheet conveying direction of the nip area N as long as the position is near the nip area N.

In addition, in the above-described embodiment, the reading apparatus which feeds the original to the reading portion and reads the information of the original has been exemplified as the sheet feeding apparatus. However, there may be employed an image forming apparatus which feeds the sheet to an image forming portion by the sheet feeding apparatus of the above-described configuration and forms an image in the sheet in the image forming portion.

Second Embodiment

Next, a second embodiment of the present invention will be described. A sheet feeding apparatus of the embodiment will be described about an example in which an image forming apparatus is used to feed the sheet to the image forming portion.

<Overall Configuration of Image Forming Apparatus>

Figure 8:
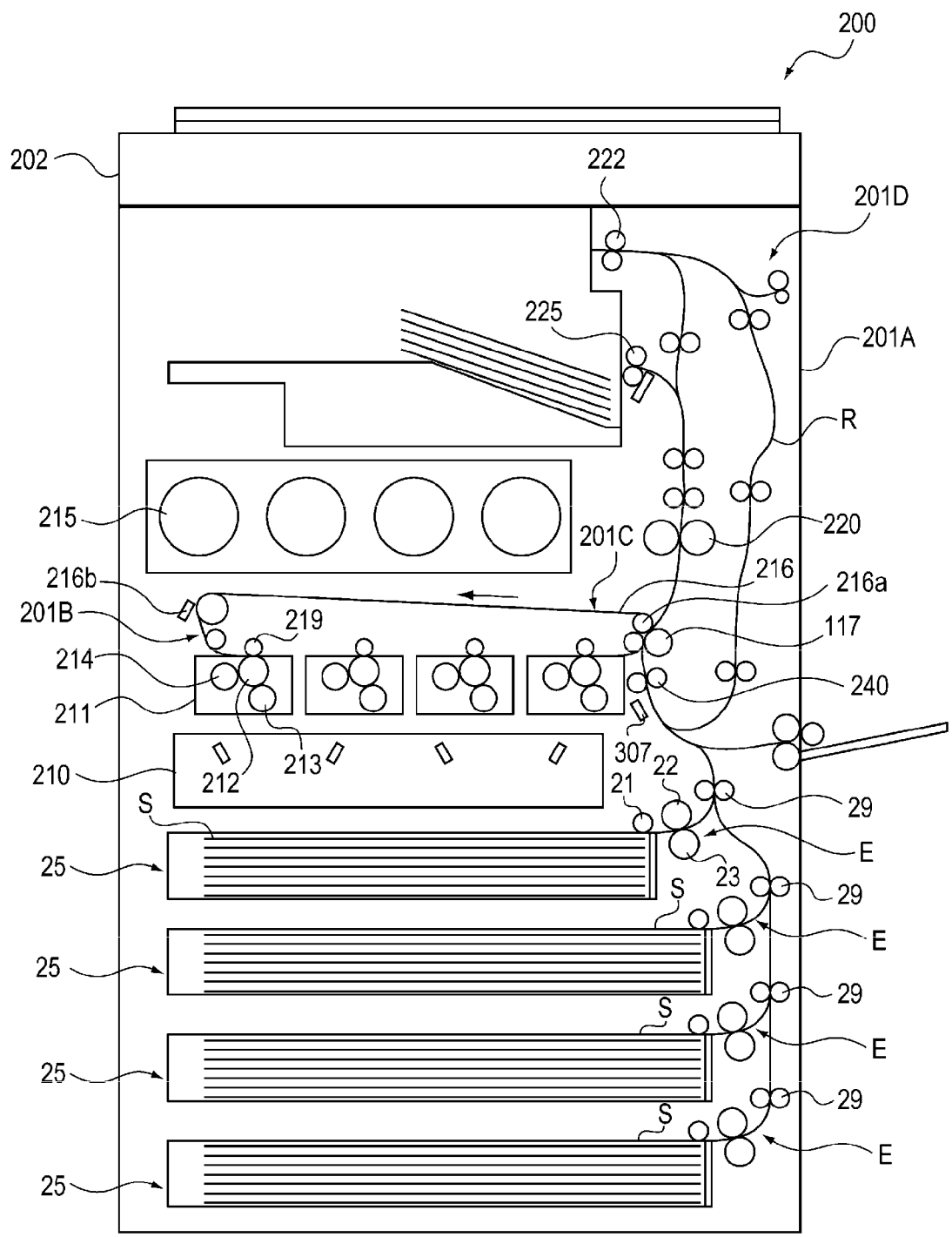
FIG. 8 is a cross-sectional view schematically illustrating an image forming apparatus according to a second embodiment.

FIG. 8 is a diagram schematically illustrating a configuration of a full-color laser beam printer as an example of the image forming apparatus according to this embodiment. In FIG. 8, a full-color laser beam copying machine 201, a printer body 201A which is the main body of the image forming apparatus, an image forming portion 201B which forms an image in the sheet, and a fixing portion 220 are provided.

There is provided an image reading apparatus 202 which is an upper device provided almost horizontally on the printer body 201A. A discharge space for discharging the sheet is formed between the image reading apparatus 202 and the printer body 201A. The sheet feeding apparatus of a sheet feeding portion 101 is disposed below the printer body.

The image forming portion 201B is a four-drum full-color scheme, in which a laser scanner 210 and four process cartridges 211 for forming toner images of four colors (yellow, magenta, cyan, and black) are provided.

Herein, each process cartridge 211 includes a photosensitive drum 212, a charger 213 as a charging portion, a developing device 214 as a developing portion, and a cleaner as a cleaning portion (not illustrated). In addition, the image forming portion 201B includes an intermediate transfer unit 201C which is disposed above the process cartridge 211.

The intermediate transfer unit 201C includes an intermediate transfer belt 216 which is wound around a drive roller 216a and a tension roller 216b. The intermediate transfer belt 216 is disposed to abut on each photosensitive drum 212, and rotates in a direction of arrow by the drive roller 216a which is driven by a drive portion (not illustrated). In addition, the intermediate transfer unit 201C is provided inside the intermediate transfer belt 216, and includes a primary transfer roller 219 which abuts on the intermediate transfer belt 216 at a position facing the photosensitive drum 212. At a position facing the drive roller 216a of the intermediate transfer unit 201C, a secondary transfer roller 217 of a secondary transfer portion is provided to transfer a color image formed on the intermediate transfer belt 216 to the sheet. A toner cartridge 215 containing each color of toner is provided above the intermediate transfer unit 201C.

The negative toner images of respective colors on the photosensitive drums 212 are sequentially transferred onto the intermediate transfer belt 216 in an overlapping manner by applying a positive transfer bias to the intermediate transfer belt 216 using the primary transfer roller 219.

The sheet fed by the sheet feeding apparatus is conveyed to a pair of registration rollers 240, and corrected in its skew feeding by the pair of registration rollers 240. Then, the sheet is conveyed to the secondary transfer portion by the pair of registration rollers 240 at a timing when the color image formed in the intermediate transfer belt 216 is matched to the leading edge of the sheet, and the toner image on the intermediate transfer belt 216 is transferred.

The sheet with the toner image transferred thereon is heated and pressurized in the fixing portion 220, and thus the color image is fixed onto the sheet. The sheet S with the image fixed is discharged to the discharge space by a pair of discharge rollers 225 and stacked. Further, when the image is formed on both surfaces of the sheet, the sheet S is conveyed, after fixed with the image, to a re-conveying path R by a pair of reversing rollers 222 which is provided in a both-side reversing portion 201D and can forwardly or reversely rotate the sheet. Thereafter, the sheet is conveyed to the image forming portion 201B again.

<Sheet Feeding Apparatus>

Figure 9:
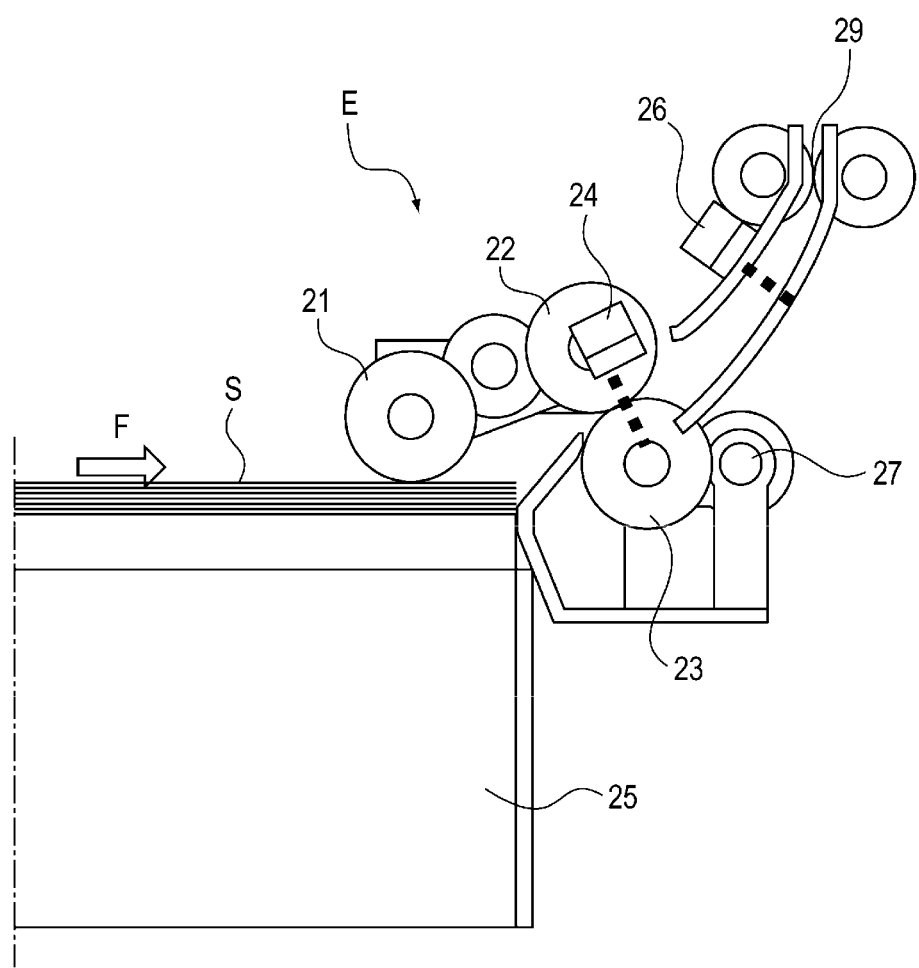
FIG. 9 is a front view schematically illustrating a sheet feeding apparatus according to the second embodiment.

Next, a sheet feeding apparatus E for feeding the sheet will be described with reference to FIG. 9. There is provided a conveying mechanism which include a pickup roller 21 to pick up the sheet S stacked in a sheet storage case 25, a feed roller 22 to convey the pickup sheet, and a retard roller 23 provided facing the feed roller to separate the plurality of sheets one by one. The feed roller 22 and the retard roller 23 serve as a conveying portion which conveys the separated sheet one by one.

The sheet storage case 25 includes a sheet storing portion to store the sheet S, a side regulating plate and a tailing edge regulating plate to regulate the position of the stored sheet, and a sheet supporting plate to raise the stored sheet to a feed position.

The pickup roller 21 rotates in a state of pressuring the surface of the sheet so as to feed the sheet S to the separating/conveying portion.

A drive transmission power (a limit value) of a torque limiter (not illustrated) is necessarily set to be larger than a friction force generated between the sheets due to a friction coefficient of the using sheet. In addition, the drive transmission power (the limit value) of the torque limiter (not illustrated) is necessarily set to be smaller than a friction force due to a friction coefficient between the sheet and the feed roller 22. Therefore, in a case where one sheet S or no sheet S enters a nip portion (a separation nip portion), which is the separation portion, between the feed roller 22 and the retard roller 23, the retard roller 23 rotates together with the feed roller 22. In addition, in a case where two or more sheets S enter the nip portion, the retard roller 23 rotates in a direction opposed to the conveying direction of the sheet indicated by the arrow F to separate the sheets S one by one.

The retard roller 23 rotates about a retard-roller holder shaft 27 as a rotation center, and is pressed toward the feed roller 22. The sheet sent by the feed roller 22 is handed over to a pair of drawing rollers 29, and conveyed to the pair of registration rollers 240 on the downstream side of the conveying path of the sheet.

Figure 10:
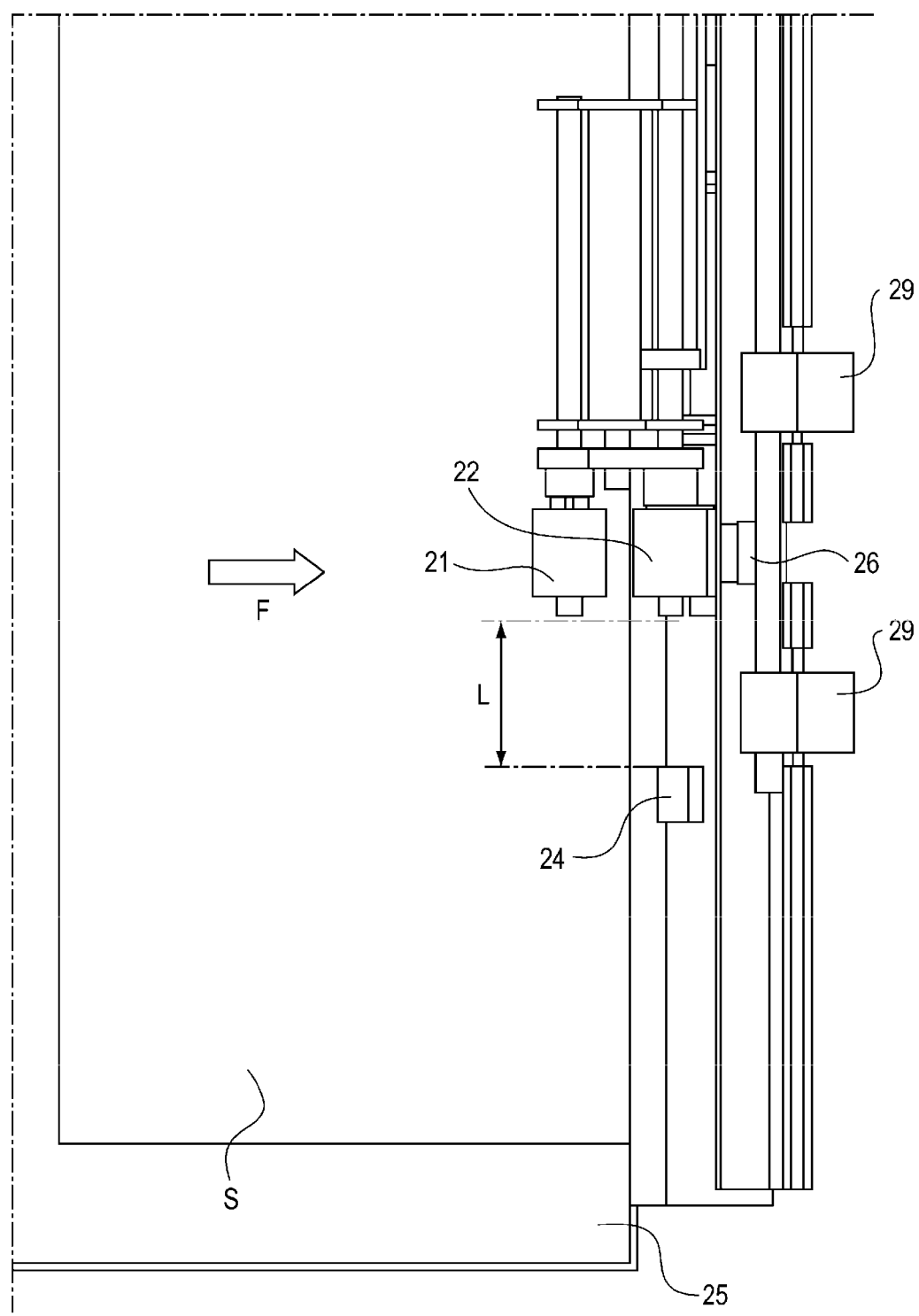
FIG. 10 is a top view schematically illustrating the sheet feeding apparatus according to the second embodiment.

A nip sensor 24 of the leading edge detecting portion is disposed at a position to detect the leading edge of the sheet in the vicinity of the nip area between the feed roller 22 and the retard roller 23. In addition, as illustrated in FIG. 10, the feed roller 22 and the retard roller 23 are disposed substantially in the center in the sheet width direction orthogonal to the conveying direction of the sheet. Then, the nip sensor 24 is at a position overlapping with the nip area between the feed roller 22 and the retard roller 23 in the conveying direction of the sheet, and not overlapping with an area of the feed roller 22 and the retard roller 23 in the sheet width direction. In other words, the nip sensor 24 is disposed at a position offset from the pair of rollers in an axial direction of the shaft which supports the feed roller 22 and the retard roller 23 in the sheet width direction.

Then, the feed roller 22 and the retard roller 23 are provided detachably attachable to the support shaft supported in a cantilever state. The nip sensor 24 is disposed at a position separated from the end portion of the support shaft in a direction of removing the roller member by a length of L or more of the roller member. With this configuration, the nip sensor 24 does not become an obstacle at the time of exchanging the feed roller 22 and the retard roller 23, so that the roller can be easily exchanged.

A drawing sensor 26 is provided on the downstream side in the conveying direction of the sheet from the nip sensor 24, and disposed near the center in the sheet width direction compared to the nip sensor 24. In addition, the drawing sensor 26 is disposed on the upstream side of the conveying path of the sheet compared to the pair of registration rollers 240. In addition, a downstream sensor 307 (see FIG. 8) is disposed on the upstream side of the conveying path of the sheet in the vicinity of the pair of registration rollers 240.

<Sheet Feeding Control>

Figure 12:
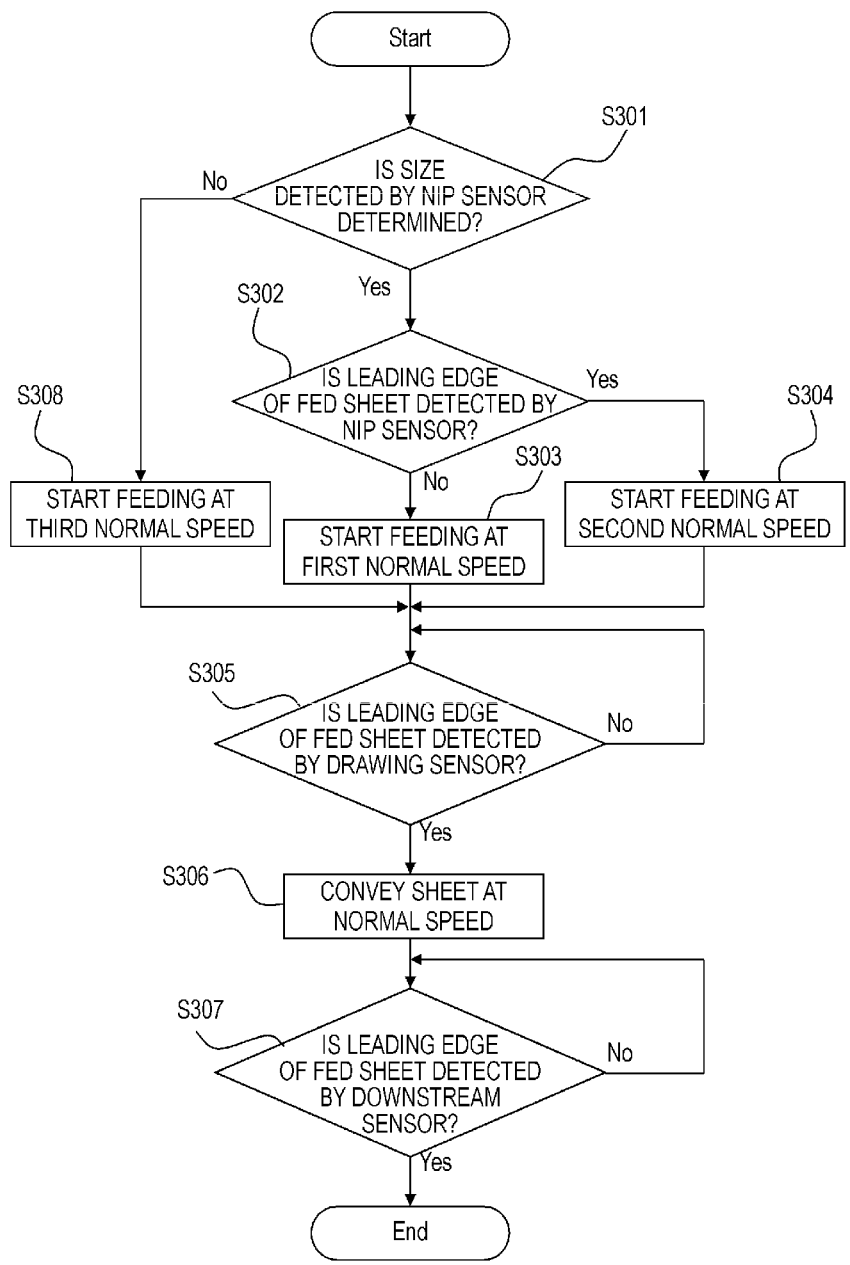
FIG. 12 is a flowchart illustrating a control in the second embodiment.
Figure 13:
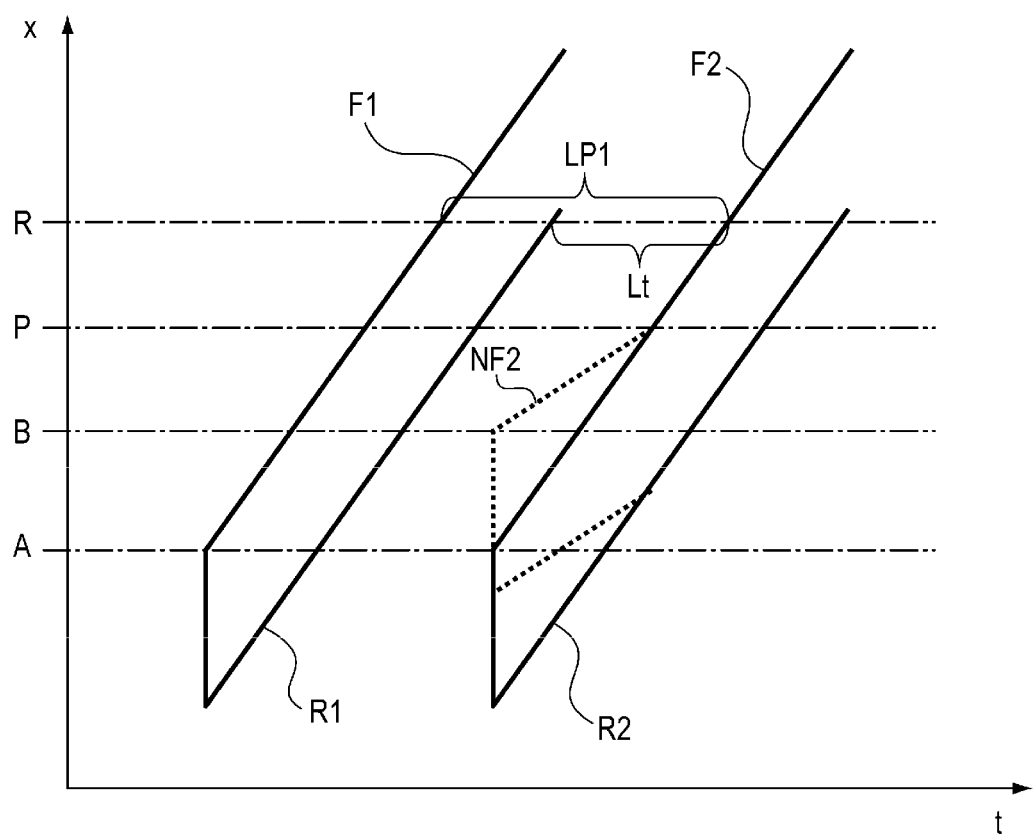
FIG. 13 is a diagram of a first drive control in the second embodiment.
Figure 14:
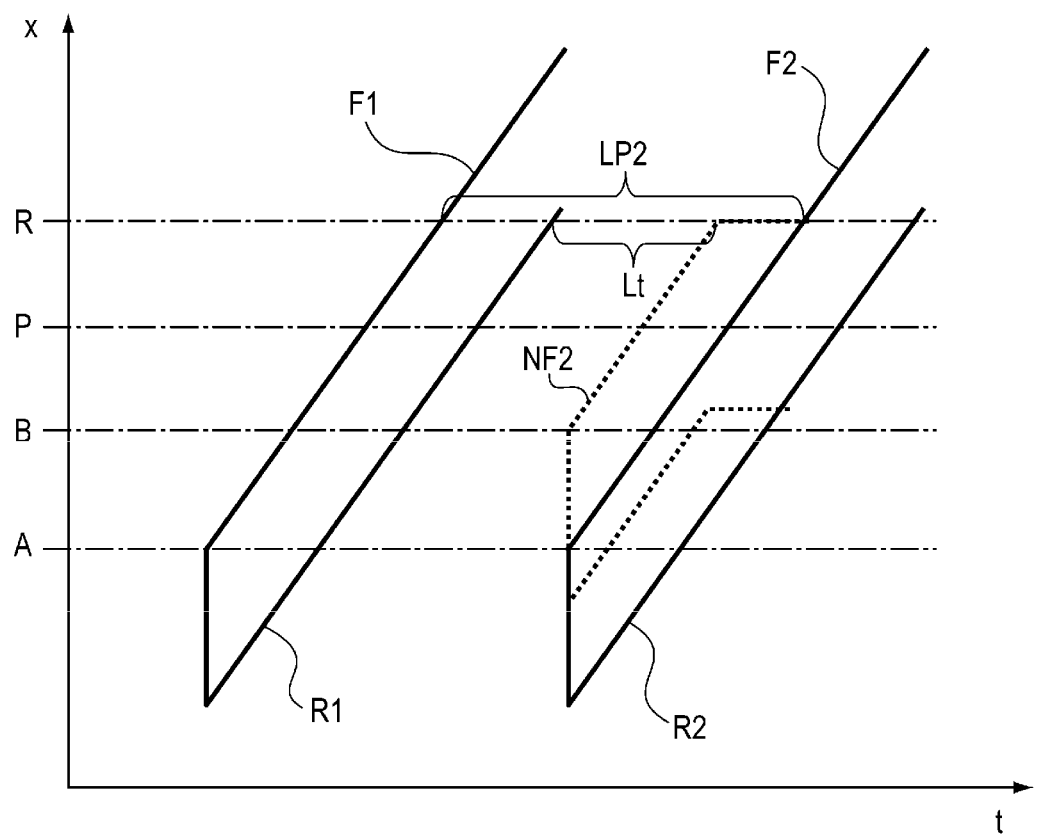
FIG. 14 is a diagram of a second drive control in the second embodiment.

Next, the sheet feeding control of this embodiment will be described with reference to FIGS. 11 to 14. Further, FIG. 11 is a block diagram of a control configuration, FIG. 12 is a flowchart illustrating a control sequence, and FIGS. 13 and 14 are diagrams of a sheet feeding control.

Figure 11:
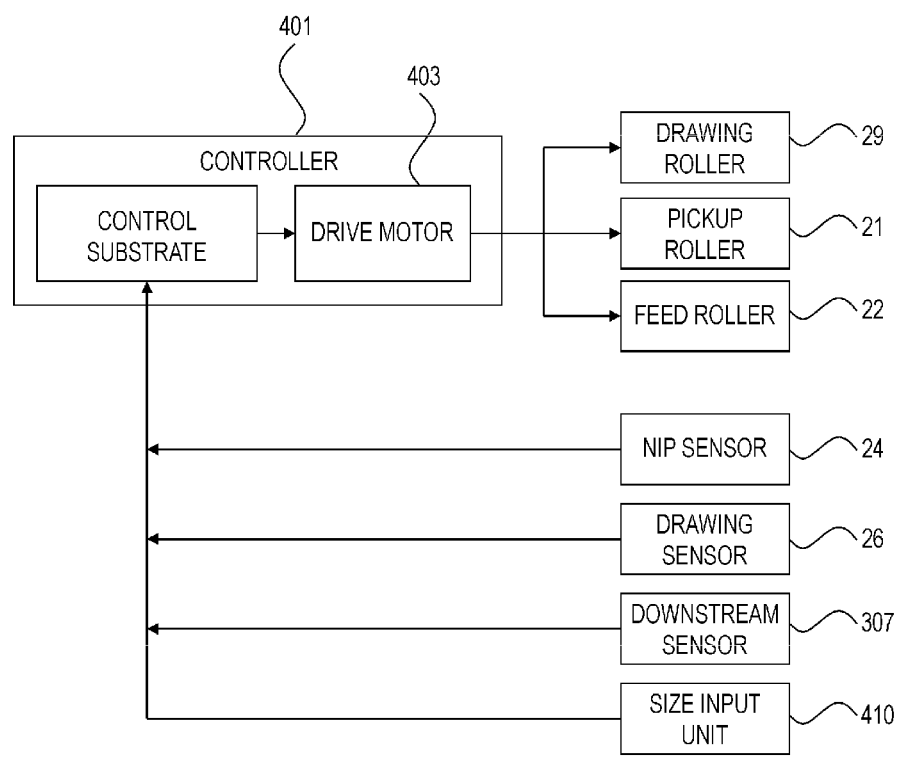
FIG. 11 is a diagram schematically illustrating control blocks according to the second embodiment.

The size of the sheet S set in the sheet storage case 25 is identified by a controller 401 based on a size input through a sheet size input unit 410 illustrated in FIG. 11. The controller 401 verifies whether the sheet width determined based on the sheet size is a sheet width detectable with the nip sensor 24 so as to determine the size detected by the nip sensor (S301). In other words, it is determined whether the fed sheet is a size enough for passing through the detection area of the nip sensor 24.

In Step S301, in a case where it is determined that the sheet has a size enough for passing through the detection area of the nip sensor 24, it is determined whether the leading edge of the fed sheet is detected by the nip sensor 24, and a first drive control is performed to control a conveying speed (S302).

(First Drive Control)

In a case where the nip sensor 24 does not detect the leading edge of the sheet within a predetermined time after the sheet conveying starts, the first drive control controls the pickup roller 21 and the feed roller 22 which convey the sheet, and a drive motor 403 which drives the pair of drawing rollers 29 so as to convey the sheet at a first normal speed (S303). The state where the leading edge of the sheet is not detected by the nip sensor 24 within the predetermined time after the sheet conveying starts means that the sheet is not in the vicinity of the nip portion at the time when the feed roller 22 and the retard roller 23 start to convey the sheet. Therefore, the sheet is conveyed at a normal speed. Then, the sheet is conveyed at a predetermined speed until the leading edge of the sheet is detected by the downstream sensor 307 in the vicinity of the pair of registration rollers 240 (S305 to S307).

On the other hand, in a case where the nip sensor 24 detects the leading edge of the sheet within the predetermined time after the sheet conveying starts, the sheet is conveyed at a second normal speed decelerated from the first normal conveying speed (S304). Then, after the leading edge of the fed sheet is detected by the drawing sensor 26, the sheet is conveyed at a predetermined speed until the leading edge of the sheet is detected by the downstream sensor 307 in the vicinity of the pair of registration rollers 240 (S305 to S307).

The state where the nip sensor 24 detects the leading edge of the sheet within the predetermined time after the sheet conveying starts means that the leading edge of the sheet is positioned in the vicinity of the nip portion at the time when the sheet conveying starts. Therefore, in this case, the sheet is conveyed at the second normal speed slower than the first normal speed until the leading edge of the sheet is detected by the drawing sensor 26 after detected by the nip sensor 24.

As described above, through the control of selecting the sheet conveying speed, the sheet is conveyed as illustrated in FIG. 13, so that the leading edge F1 of the sheet in a case where the leading edge of the next sheet is conveyed from the vicinity A of the end portion of the sheet storage case is arranged to the leading edge NF2 of the sheet in a case where the leading edge is conveyed from the vicinity B of the nip portion of the separation portion at a position P of the drawing sensor 26. Therefore, in a case where the leading edge of the next sheet is conveyed from the vicinity A of the end portion of the sheet storage case and in a case where the leading edge is conveyed from the vicinity B of the nip portion, an inter-sheet time Lt is set in a predetermined range which is necessary for the tailing edge R1 of the preceding sheet and the leading edge F2 of the next sheet at the position R of the pair of registration rollers 240 or the downstream sensor 307 after the conveyance.

(Second Drive Control)

In Step S301 described above, in a case where it is determined that the sheet has a size enough for passing through the detection area of the nip sensor 24, a second drive control is performed to control the conveying speed without using the detection of the nip sensor 24 (S308).

The second drive control conveys the sheet at a third normal speed until the leading edge of the sheet is detected by the drawing sensor 26 after the sheet conveying starts. The third normal speed is a speed slower than the first normal speed and faster than the second normal speed. Then, after the leading edge of the sheet is detected by the drawing sensor 26, the sheet is conveyed at a predetermined conveying speed up to the pair of registration rollers 240.

In a case where the nip sensor 24 cannot detect whether the leading edge of the sheet reaches the nip portion, as illustrated in FIG. 14, it is not possible to determine whether the leading edge of the sheet is conveyed from the vicinity A of the end portion of the sheet storage case at the time when the sheet conveying starts, or whether the leading edge of the sheet is conveyed from the vicinity B of the separation nip portion. Therefore, even in any one of a case where the leading edge of the next sheet is conveyed from the vicinity A of the end portion of the sheet storage case and a case where the leading edge of the next sheet is conveyed from the vicinity B of the separation nip portion, the tailing edge R1 of the preceding sheet and the inter-sheet time Lt of the leading edge NF2 of the next sheet at the position R of the pair of registration rollers after the conveyance are set in a predetermined range by feeding the sheet at the third normal speed.

Then, through the drive control as described above, the distance between the conveying sheets can be narrowed without excessively increasing the sheet conveying speed, and producibility can be improved without increasing energy consumption and noises.

Further, the sheet conveying in the sheet feeding apparatus E is performed by the first drive control and the second drive control, and the determination on the conveyance delay is made by the drawing sensor 26.

First Modification of Second Embodiment

Figure 15:
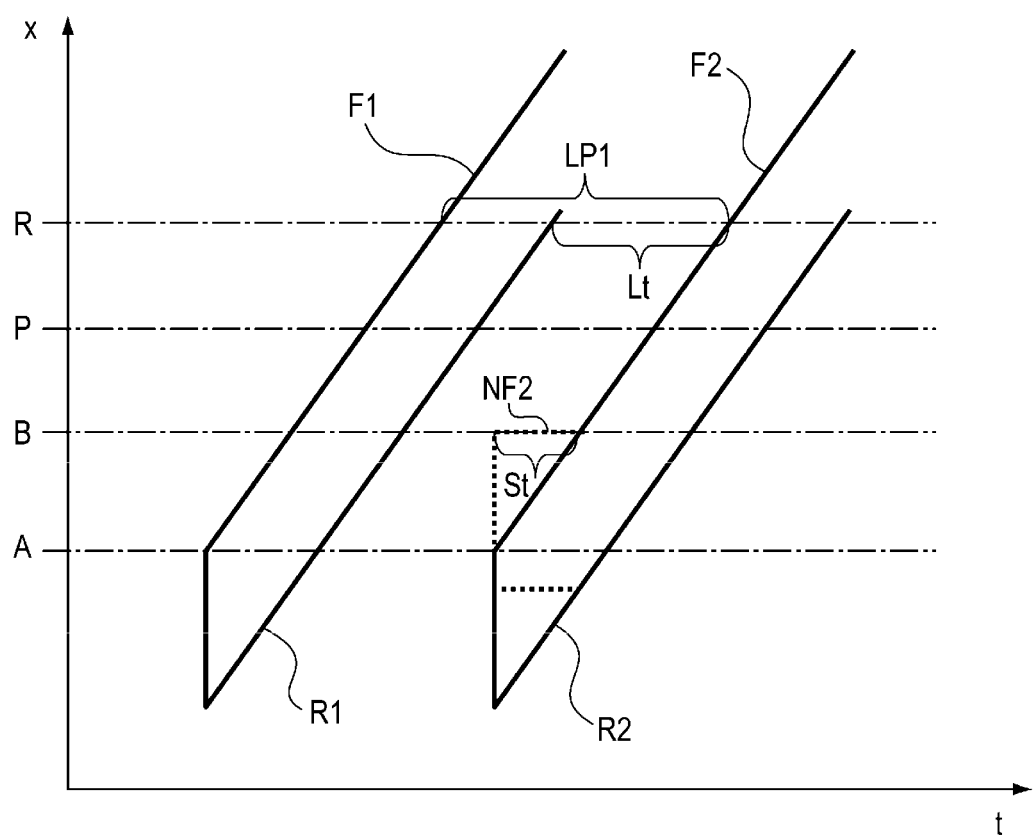
FIG. 15 is a diagram of a first drive control in a first modification of the second embodiment.
Figure 16:
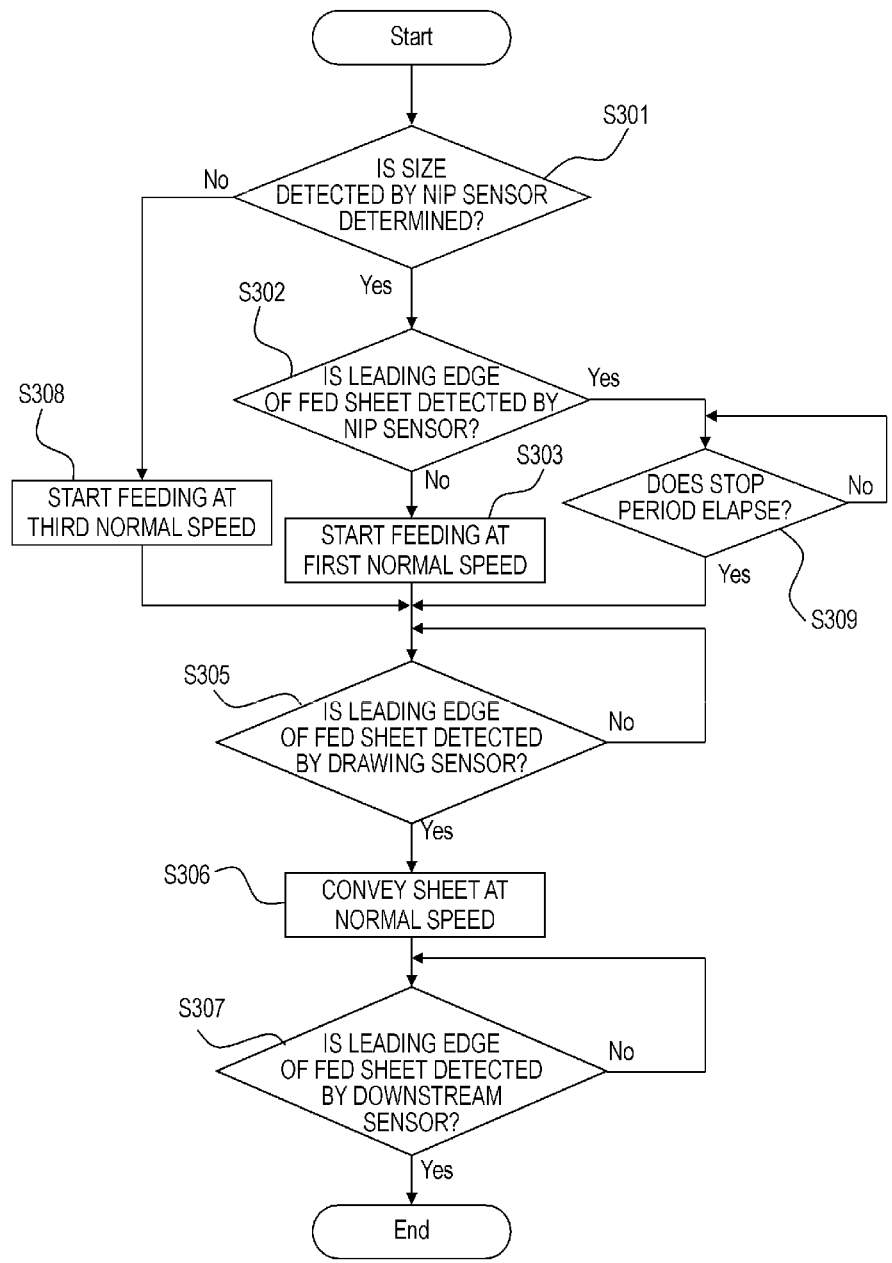
FIG. 16 is a flowchart illustrating a control in the first modification of the second embodiment.

Next, modifications of the second embodiment will be described with reference to FIGS. 15 and 16. This modification is different from the second embodiment in that the conveyance is stopped during a predetermined time in the first drive control. In other words, in the above-described embodiment, the sheet is conveyed at the second normal speed slower than the first normal speed in the first drive control in a case where the nip sensor 24 detects the leading edge of the sheet within the predetermined time after the sheet conveying starts. With this regard, in this modification, the sheet conveying is stopped during a predetermined stop period St in the first drive control in a case where the nip sensor 24 detects the leading edge of the sheet within the predetermined time after the sheet conveying starts (S309). Then, after the stop of the predetermined time, the sheet is conveyed at the first normal conveying speed up to the pair of registration rollers 240 through the pair of drawing rollers 29.

As described above, since the sheet conveying is stopped during the predetermined stop period St in the first drive control, the same effect as a case where the speed is reduced in the second embodiment can be achieved. In other words, the sheet is conveyed such that the leading edge F1 of the sheet in a case where the leading edge of the next sheet is conveyed from the vicinity A of the end portion of the sheet storage case and the leading edge NF2 of the sheet in a case where the leading edge of the next sheet is conveyed from the vicinity B of the separation nip portion are arranged at the position P of the drawing sensor 26. Therefore, the tailing edge R1 of the preceding sheet at the position R of the pair of registration rollers after the conveyance and the inter-sheet time Lt of the leading edge F2 of the next sheet are set in a predetermined range.

Second Modification of Second Embodiment

The normal conveying speed in the second drive control may be different from or equal to that in the first drive control.

In addition, the producibility in the second drive control may not be greater than that in the first drive control. An inter-sheet time LP1 determining the producibility of the first drive control and an inter-sheet time LP2 determining the second drive control satisfy a relation of LP1≤LP2. Further, LP1 and LP2 are the inter-sheet time during a period when the leading edge F1 of the preceding sheet and the leading edge F2 of the next sheet are at the position P of the pair of registration rollers.

In addition, the detection portion which can detect the leading edge of the sheet at the vicinity of the nip portion between the feed roller 22 and the retard roller 23 may detect the sheet S in a direct optical manner, or may detect the sheet S in a mechanical manner using a flag or the like.

In addition, a sheet size input portion 408 may receive a user input from an operation portion of the apparatus, or may receive a detection input of a size detecting portion in a sheet storage case.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-117181, filed Jun. 10, 2015, No. 2015-172984, filed Sep. 2, 2015, which are hereby incorporated by reference herein in their entirety.

What is claimed is:

1. A sheet feeding apparatus, comprising:
a size detecting portion which detects a size of a sheet in a sheet width direction orthogonal to a conveying direction of a fed sheet;
a conveying mechanism, the conveying mechanism including,
a feed rotating member which feeds the sheet stacked on a stacking member, and
a conveying portion which conveys the sheet fed by the feed rotating member;
a detecting portion which detects the sheet fed by the feed rotating member; and
a controller which controls the conveying mechanism based on a detection result of the size detecting portion in a manner such that,
when a size in the sheet width direction of the sheet fed by the rotating member is a first size, the controller performs a first control on the conveying mechanism by using a detection result of the detecting portion, and
when a size in the sheet width direction of the sheet fed by the rotating member is a second size, the controller performs a second control on the conveying mechanism without using the detection result of the detecting portion, and
wherein the detecting portion is disposed such that the sheet having the first size in the sheet width direction fed by the feed rotating member passes through a detection area of the detecting portion and the sheet having the second size in the sheet width direction fed by the feed rotating member does not pass through the detection area of the detecting portion.

2. A sheet feeding apparatus, comprising:
a size detecting portion which detects a size of a sheet in a sheet width direction orthogonal to a conveying direction of a fed sheet;
a feed rotating member which feeds a sheet stacked on a stacking member;
a moving portion which is movable to a feed position where the feed rotating member abuts on the sheet stacked on the stacking member, and to a retract position where the feed rotating member is separated from the sheet;
a conveying portion which conveys the sheet fed by the feed rotating member;
a leading edge detecting portion which detects a leading edge of the sheet reaching the conveying portion; and
a controller which controls the moving portion based on a detection result of the size detecting portion in a manner such that,
when a size in the sheet width direction of the sheet fed by the feed rotating member is a first size, the controller causes the moving portion to move the feed rotating member to the retract position from the feed position by using a detection result of the leading edge detecting portion, and
when a size in the sheet width direction of the sheet fed by the feed rotating member is a second size, the controller causes the moving portion to move the feed rotating member to the retract position the feed position after a predetermined time elapses since the sheet starts to be fed by the feed rotating member, wherein the leading edge detecting portion is disposed such that the sheet having the first size in the sheet width direction fed by the feed rotating member passes through a detection area of the leading edge detecting portion, and the sheet having the second size in the sheet width direction does not pass through the detection area when fed.

3. The sheet feeding apparatus according to claim 2, wherein the conveying portion nips and conveys the sheet using a first member and a second member, and wherein the leading edge detecting portion detects a leading edge of the sheet which passes through a detection area positioned on an extension of the sheet width direction in a nip area between the first member and the second member.

4. The sheet feeding apparatus according to claim 3, wherein the first member is a separation roller which rotates such that the sheet fed by the feed rotating member is conveyed to a downstream side in a conveying direction of the sheet, and wherein the second member is a retard roller which rotates such that the sheet is conveyed in a direction of returning to an upstream side in the conveying direction of the sheet.

5. The sheet feeding apparatus according to claim 3, wherein the first member is a separation roller which rotates such that the sheet fed by the feed rotating member is conveyed to a downstream side in a conveying direction of the sheet, and wherein the second member is a separation member which presses the sheet against the separation roller.

6. The sheet feeding apparatus according to claim 3, wherein the first member and the second member are a pair of conveying rollers which rotate such that the sheet fed by the feed rotating member is conveyed to a downstream side in a conveying direction of the sheet.

7. The sheet feeding apparatus according to claim 3, wherein the nip area is an area where the first member and the second member come in contact with each other.

8. The sheet feeding apparatus according to claim 2, wherein a mixed mode is included in which a plurality of sheets having different size in the sheet width direction is conveyed, and wherein, in the case of the mixed mode, the controller causes the moving portion to move the feed rotating member to the retract position after a predetermined time elapses after the sheet starts to be fed by the feed rotating member regardless of a detection result of the size detecting portion.

9. The sheet feeding apparatus according to claim 2, wherein a mixed mode is included in which a plurality of sheets having different size in the sheet width direction is conveyed, and wherein, in the mixed mode, the controller causes the moving portion to move the feed rotating member to the retract position after a predetermined time elapses after the sheet starts to be fed by the feed rotating member, and in a case where a leading edge of the conveyed sheet is detected by the leading edge detecting portion before the predetermined time elapses, the controller causes the moving portion to move the feed rotating member to the retract position based on the detection by the leading edge detecting portion.

10. The sheet feeding apparatus according to claim 2, wherein the predetermined time is a time until a leading edge of the fed sheet reaches the conveying portion after the feed rotating member starts a feeding operation of the sheet.

11. The sheet feeding apparatus according to claim 2, wherein the size detecting portion detects a size of the sheet stacked on the stacking member.

12. A sheet feeding apparatus, comprising:

a size detecting portion which detects a size of a sheet in a sheet width direction orthogonal to a conveying direction of a fed sheet;

a feed rotating member which feeds a sheet stacked on a stacking member;

a conveying portion which conveys the sheet fed by the feed rotating member;

a leading edge detecting portion which detects a leading edge of the sheet reaching the conveying portion; and a controller which controls operations of the feed rotating member and the conveying portion based on the detection of the size detecting portion in a manner such that, in a case where the size detecting portion detects that the sheet fed by the feed rotating member has a size in the sheet width direction sufficient to pass through a detection area of the leading edge detecting portion, the controller performs a first drive control by using the detection result of the leading edge detecting portion, and in a case where the size detecting portion detects that the fed sheet has a size in the sheet width direction insufficient to pass through the detection area, the controller performs a second drive control not by using the detection result of the leading edge detecting portion.

13. The sheet feeding apparatus according to claim 12, wherein the conveying portion nips and conveys the sheet using a first member and a second member, and wherein the leading edge detecting portion detects a leading edge of the sheet which passes through a detection area positioned on an extension of the sheet width direction in a nip area between the first member and the second member.

14. The sheet feeding apparatus according to claim 13, wherein at least one of the first member and the second member is a roller member which is detachably attachable with respect to a support shaft supported in a cantilever state, and wherein the leading edge detecting portion is disposed at a position separated from an end portion of the support shaft in a direction of removing the roller member by a length or more of the roller member.

15. The sheet feeding apparatus according to claim 12, wherein, in a case where the leading edge detecting portion does not detect the sheet within a predetermined time after a sheet conveying starts, the first drive control conveys the sheet at a first speed, and in a case where the leading edge detecting portion detects the sheet within the predetermined time, the controller conveys the sheet at a second speed slower than the first speed until the sheet reaches a predetermined position.

16. The sheet feeding apparatus according to claim 15, wherein the second drive control conveys the sheet at a third speed slower than the first speed and faster than the second speed.

17. The sheet feeding apparatus according to claim 12, wherein, in a case where the leading edge detecting portion does not detect the sheet within a predetermined time after a sheet conveying starts, the first drive control conveys the sheet at a first speed, and in a case where the leading edge detecting portion detects the sheet within the predetermined time, the controller stops the sheet conveying for a predetermined time and then conveys the sheet at the first speed.

18. The sheet feeding apparatus according to claim 12, wherein the first drive control and the second drive control are a control in which a leading edge of the conveyed sheet is within a predetermined distance range with respect to a tailing edge of a preceding sheet until the leading edge reaches a predetermined position.

19. A reading apparatus which feeds a sheet and reads information on the sheet, comprising:

a sheet feeding apparatus; and a reading portion which reads information written in the sheet fed by the sheet feeding apparatus, wherein the sheet feeding apparatus includes a size detecting portion which detects a size of a sheet in a sheet width direction orthogonal to a conveying direction of a fed sheet, a conveying mechanism, the conveying mechanism including, a feed rotating member which feeds the sheet stacked on a stacking member, and a conveying portion which conveys the sheet fed by the feed rotating member, a leading edge detecting portion which detects a leading edge of the sheet reaching the conveying portion, and a controller which controls the conveying mechanism based on the detection by the size detecting portion in a manner such that, in a case where the controller decides based on a detection result of the size detecting portion that the sheet fed by the feed rotating member has a size in the sheet width direction sufficient to pass through a detection area of the leading edge detecting portion, the controller performs a first drive control by using the detection result of the leading edge detecting portion, and in a case where the controller decides based on a detection result of the size detecting portion that the fed sheet has a size in the sheet width direction insufficient to pass through the detection area, the controller performs a second drive control without using the detection result of the leading edge detecting portion.

20. An image forming apparatus which feeds a sheet and forms an image in the sheet, comprising:

a sheet feeding apparatus; and an image forming portion which forms an image on the fed sheet, wherein the sheet feeding apparatus includes a size detecting portion which detects a size of a sheet in a sheet width direction orthogonal to a conveying direction of a fed sheet, a conveying mechanism, the conveying mechanism including, a feed rotating member which feeds a sheet stacked on a stacking member, and a conveying portion which conveys the sheet fed by the feed rotating member, a leading edge detecting portion which detects a leading edge of the sheet reaching the conveying portion, and a controller which controls the conveying mechanism based on the detection of the size by the size detecting portion in a manner such that, in a case where the controller decides based on a detection result of the size detecting portion that the sheet fed by the feed rotating member has a size in the sheet width direction sufficient to pass through a detection area of the leading edge detecting portion, the controller performs a first drive control by using the detection result of the leading edge detecting portion, and in a case where the controller decides based on a detection result of the size detecting portion that the fed sheet has a size in the sheet width direction insufficient to pass through the detection area, the controller performs a second drive control without using the detection result of the leading edge detecting portion.

* * * * *